United States Patent [19]
Ott et al.

[11] Patent Number: 5,321,344
[45] Date of Patent: Jun. 14, 1994

[54] CONTROL CIRCUIT FOR MODEL RAILROADS

[76] Inventors: Kenneth Ott, 118 E. Ash St., Lombard, Ill. 60148; David Ott, 350 N. Grant, Westmont, Ill. 60559

[21] Appl. No.: 877,727

[22] Filed: Apr. 4, 1992

[51] Int. Cl.$^5$ .................................................. H02P 7/74
[52] U.S. Cl. ...................................... 318/280; 318/257; 318/51; 318/603
[58] Field of Search ............... 318/16, 696, 685, 739, 318/280–293, 599, 603; 307/65, 293, 318; 361/90–93; 340/825.69, 825.72; 180/167, 168; 446/455; 104/301, 300; 246/187 B

[56] References Cited

U.S. PATENT DOCUMENTS

| | | | |
|---|---|---|---|
| 3,703,648 | 11/1972 | Wrabel | 307/293 |
| 3,946,292 | 3/1976 | Tanikoshi | 318/290 |
| 3,955,129 | 5/1976 | Wagner et al. | 318/55 |
| 4,028,604 | 6/1977 | Togo et al. | 318/596 |
| 4,066,941 | 1/1978 | Foster | 318/603 |
| 4,216,418 | 8/1980 | Wagensonner et al. | 318/318 |
| 4,341,982 | 7/1982 | Lahti et al. | 318/51 |
| 4,356,526 | 10/1982 | Russell | 361/92 X |
| 4,413,211 | 11/1983 | Fowler | 318/257 |
| 4,454,454 | 6/1984 | Valentine | 318/293 |
| 4,520,418 | 5/1985 | Susi | 361/92 |
| 4,572,996 | 2/1986 | Hanschke et al. | 318/603 X |
| 4,609,954 | 9/1986 | Bolton et al. | 318/561 X |
| 4,685,023 | 8/1987 | Heaston | 361/92 X |
| 4,703,244 | 10/1987 | Takeuchi et al. | 318/696 |
| 4,764,839 | 8/1988 | Laud | 361/92 |
| 4,914,431 | 4/1990 | Severson et al. | 340/825.69 |
| 5,155,427 | 10/1992 | Hori | 318/696 |
| 5,184,048 | 2/1993 | Severson et al. | 318/280 |

*Primary Examiner*—Paul Ip
*Attorney, Agent, or Firm*—Douglas B. White

[57] ABSTRACT

A control circuit for a model railroad utilizes a digital counter to control the modes of motor operation. To select a mode of operation a switch is used to repeatedly ground the base of a transistor circuit, causing pulses to be sent to a counter. By using the switch to hold the base of the transistor to ground, the counter sequencing is locked and prevented from further sequencing until the track power is turned off for a defined minimum amount of time. Release of this switched ground places the circuit under track control where short power interrupts cause the counter to sequence to the next count and therefore to sequence the modes of motor operation.

17 Claims, 1 Drawing Sheet

CONTROL CIRCUIT FOR MODEL RAILROADS

BACKGROUND OF THE INVENTION

1. Field of the Invention

This invention relates generally to control systems for model railroads, and more specifically to a locomotive motor control.

2. Description of the Prior Art

Prior motor control circuits are generally exemplified by the electronic control system presented in U.S. Pat. No. 4,914,431, and earlier systems described therein. Particularly, these motor control circuits are carried within the locomotive unit and operate the motor in a sequence of modes; such as forward, neutral and reverse. And a typical locomotive either employs a manual switch on the unit to select the desired mode of operation, or a control circuit in the unit senses a power interrupt on the track to sequence the motor to a different mode of operation.

SUMMARY OF THE INVENTION

Accordingly, it is the object of the present invention to provide an improved versatile motor control which (1) allows the user to lock the motor into the desired mode of operation and to hold that selected mode during short power interruptions, (2) emulates prior control circuits by using a manual switch to sequence the motor control between modes of operation, (3) emulates prior control circuits by optionally allowing "power interrupt" sequencing of the modes of motor operation, and (4) provides an automatic reset after power has been off for a defined minimum amount of time.

The control circuit of the present invention utilizes a digital counter to control the modes of operation of a motor. The counter output is sensed by a transistor drive circuit to power the motor in a mode corresponding to the registered count, and is sequenced through five states (forward, neutral, reverse and reset) by pulses generated with a switch actuated transistor circuit. To select a mode of operation the switch is used to repeatedly ground the base of the transistor, causing pulses to be sent to the counter. By using the switch to hold the base of the counter control transistor to ground, the counter sequencing is locked and prevented from further sequencing until the track power is turned off for a defined minimum amount of time.

In a further feature, the circuit of the present invention allows the sequencing of the mode of motor operation to be placed under track control, where brief power interrupts cause the counter to sequence to the next count and therefore sequence the modes of motor operation. This is accomplished by disconnecting the switched ground on the counter control transistor to allow it to respond to track power interruptions.

Finally, with the circuit of the present invention, counter reset is obtained (1) when the counter is sequenced to a predetermined count and (2) whenever power has been OFF for a predetermined amount of time. This reset is accomplished by use of RC decay circuits to slowly bleed off charge during the power interrupt, where the time required to enable the reset function is determined by the RC constant of the circuit.

Figure 1:
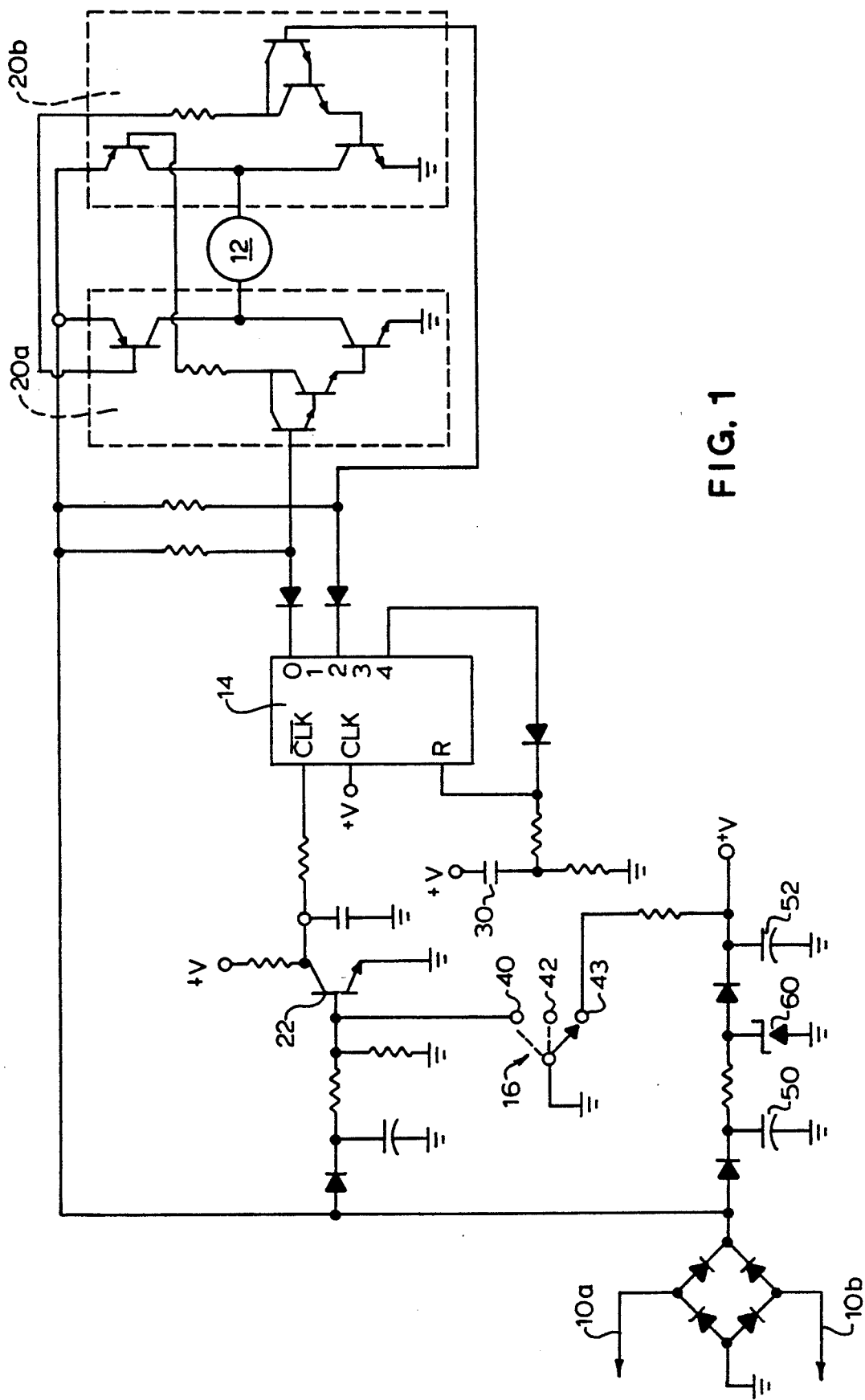
FIG. 1 is a schematic of the control circuit of the present invention.

While the invention will be described in connection with a preferred embodiment, it will be understood that it is not the intent to limit the invention to that embodiment. On the contrary, it is the intent to cover all alternatives, modifications, and equivalents as may be included within the spirit and scope of the invention as defined by the appended claims.

DESCRIPTION OF THE PREFERRED EMBODIMENT

Turning to the schematic of FIG. 1, there is shown a circuit for controlling the motor of a locomotive for a model train. Power is transmitted to the circuit through the track and picked up at connections 10a and 10b. Typically, this track voltage is an AC signal, but the circuit described herein will also function with a DC track voltage.

The control circuit of the present invention employs transistors to supply power to a motor 12, and the operational state of these transistors is established by the operational state (the count) of a digital counter 14. By use of a switch 16 to sequence the counter, the mode of operation of the motor is likewise selected. Moreover, as will be described below, this switch will also affect the reset function.

During operation of the circuit from a track carrying power as an AC signal, a rectified signal is provided to the power transistor arrays 20a and 20b which operate the motor. Additionally, the rectified signal is also provided to the input of the counter 14 through the counter control transistor 22. This control transistor 22 is switched to its ON state when track voltage is ON, and is switched to its OFF state when track voltage is OFF. When the control transistor 22 is switched from its OFF state to its ON state, a "falling edge" occurs which provides an incrementing input signal to the $\overline{\text{CLK}}$ input of the counter. Successive incrementing signals from the control transistor shift the counter to successive states represented by the counts "0", "1", "2", "3", and "4"; and these counts are available as outputs. When the counter is in state "0", the power transistors 20a drive the motor in a first (forward) direction, and when the counter is in state "2", the power transistors 20b drive the motor in a second (reverse) direction. Counter states "1" and "3" represent neutral states.

The counter is reset in two situations: when power is initially applied after being off for a defined minimum period of time, and when the counter is incremented to a predesignated state (count "4"). When power is first applied to the circuitry, capacitor 30 is in a discharged condition, and the application of power to the circuit consequently causes a pulse to the reset terminal R of the counter. After start-up, a pulse to the negative side of the capacitor similarly delivers a reset pulse to the counter. Therefore, the counter will reset each time it is sequenced to count "4", as well as each time power is applied after a prolonged shut-down.

Control switch 16 is grounded at one pole, and the other pole may be switched to in any one of three positions. When the switch connection is made to terminal 40, a ground potential is provided to the base of the counter control transistor 22, causing it to switch to its OFF state. Removal of this ground connection switches transistor 22 ON and causes the counter to sequence to the next count; and this likewise causes motor operation to sequence to the next mode of operation. Repeated connection of switch 16 to terminal 40 causes the motor operation to sequence through forward, neutral, reverse, neutral, and reset, corresponding to counts "0", "1", "2", "3", and "4", respectively.

When switch 16 remains connected to terminal 40, counter control transistor 22 remains OFF, and locks the motor operational state in its last selected mode. And this lock will survive short power interruptions, as the power supply capacitors retain enough charge to temporarily operate the logic circuit. When power has been off long enough to drain the power supply capacitors, the circuit will "reset" when power is reapplied (as described above).

When switch 16 is switched to connect the ground to terminal 42, control transistor 22 is no longer inhibited and brief track voltage interruptions will cause the counter control transistor to pulse the counter. And this will cause the circuit to sequence through the operational modes in response to the power interrupt.

When the switch 16 ground is switched to terminal 43, the power supply filter capacitors 50 and 52 are discharged to ground through the switch. Additionally, reset capacitor 30 is also discharged. Consequently, when track power is again applied, after the capacitors have been discharged, the counter "resets" to provide the familiar predetermined reset-to-forward feature, whenever the track power has been turned OFF for a predetermined minimum time. To regulate this minimum time, zener diode 60 maintains the logic circuit voltage +V at a consistent level despite variations in track voltage, and the RC constant for the decay of the power supply voltage +V is selected to yield the desired time intervals. In practice it has been determined that when switch 16 is connected to terminal 40, the RC constant should be chosen to allow a "reset" only after the power has been interrupted for approximately 24 hours; and when switch 16 is connected to terminal 43, the RC constant should be chosen to provide a "reset" after a power interruption of 5 to 6 seconds; and when switch 16 is connected to terminal 42, the RC constant should be chosen to provide a "reset" after a power interruption of approximately 24 hours.

From the foregoing description, it will be apparent that modifications can be made to the apparatus and method for using same without departing from the teachings of the present invention. Accordingly, the scope of the invention is only to be limited as necessitated by the accompanying claims.

We claim:

1. An electronic motor control circuit for a model railroad for driving a motor of a motorized unit in a selected mode comprising:
   switch means on said motorized unit for selecting a mode of motor operation, for causing the selection of said mode of motor operation to be responsive to short power interruptions, and for selectively locking said motor operation in said selected mode to maintain said motor operation selection in said selected mode during short power interruptions;
   logic means coupled to said switch means for providing a mode signal responsive to said switch means; and
   electronic means coupled to said logic means for driving said motor in a mode corresponding to said mode signal.

2. The electronic motor control circuit for a model railroad of claim 1 wherein said logic means comprises a digital counter coupled to said switch means such that the registered count of said counter is incremented in response to signals received from said switch means.

3. The electronic motor control circuit for a model railroad of claim 2 wherein said switch means is operable to selectively maintain said counter at a selected registered count during short power interruptions.

4. The electronic motor control circuit for a model railroad of claim 3 wherein said switch means comprises transistor control of the input signal to said counter, and said switch means further comprises a manual switch operable to selectively ground the base of said transistor, wherein said counter increments the registered count in response to successive actuation of said manual switch.

5. The electronic motor control circuit for a model railroad of claim 4 further comprising a resistor and capacitor circuit for maintaining power to the control circuit for a defined period of time, said resistor and capacitor circuit having a defined RC constant for selected conditions of said switch means, whereby the power to the control circuit is substantially maintained during short interruptions in track voltage.

6. The electronic motor control circuit for a model railroad of claim 5 wherein said RC constant is selected to substantially maintain power and thereby to hold said counter in said last selected count for approximately 24 hours after track power is interrupted, when said switch means is connected to ground said base of said transistor.

7. The electronic motor control circuit for a model railroad of claim 5 wherein said RC constant is selected to substantially maintain power and thereby to hold said counter in said last selected count for at least 24 hours after track power is interrupted when said switch means is disconnected from said circuit.

8. The electronic motor control circuit for a model railroad of claim 2 further comprising capacitor controlled reset means coupled to the reset terminal of said counter.

9. The electronic motor control circuit for a model railroad of claim 8 wherein said reset means is coupled to said counter output to cause said counter to reset upon reaching a predetermined count.

10. The electronic motor control circuit for a model railroad of claim 8 wherein said reset means is coupled to said track voltage to provide a reset signal to said counter when track voltage is applied, providing the capacitance of said reset means has been sufficiently discharged.

11. The electronic motor control circuit for a model railroad of claim 4 further comprising capacitor controlled reset means coupled to the reset terminal of said counter and coupled to said counter output to cause said counter to reset upon reaching a predetermined count.

12. The electronic motor control circuit for a model railroad of claim 5 further comprising capacitor controlled reset means coupled to the reset terminal of said counter and coupled to said counter output to cause said counter to reset upon reaching a predetermined count.

13. The electronic motor control circuit for a model railroad of claim 6 further comprising capacitor controlled reset means coupled to the reset terminal of said counter and coupled to said counter output to cause said counter to reset upon reaching a predetermined count.

14. The electronic motor control circuit for a model railroad of claim 7 further comprising capacitor controlled reset means coupled to the reset terminal of said counter and coupled to said counter output to cause said counter to reset upon reaching a predetermined count.

15. The electronic motor control circuit for a model railroad of claim 12 wherein said reset means is coupled to said track voltage to provide a reset signal to said counter when track voltage is applied, providing the capacitance of said reset means has been sufficiently discharged.

16. The electronic motor control circuit for a model railroad of claim 13 wherein said reset means is coupled to said track voltage to provide a reset signal to said counter when track voltage is applied, providing the capacitance of said reset means has been sufficiently discharged.

17. The electronic motor control circuit for a model railroad of claim 14 wherein said reset means is coupled to said track voltage to provide a reset signal to said counter when track voltage is applied, providing the capacitance of said reset means has been sufficiently discharged.

* * * * *